United States Patent Office 3,496,864
Patented Feb. 24, 1970

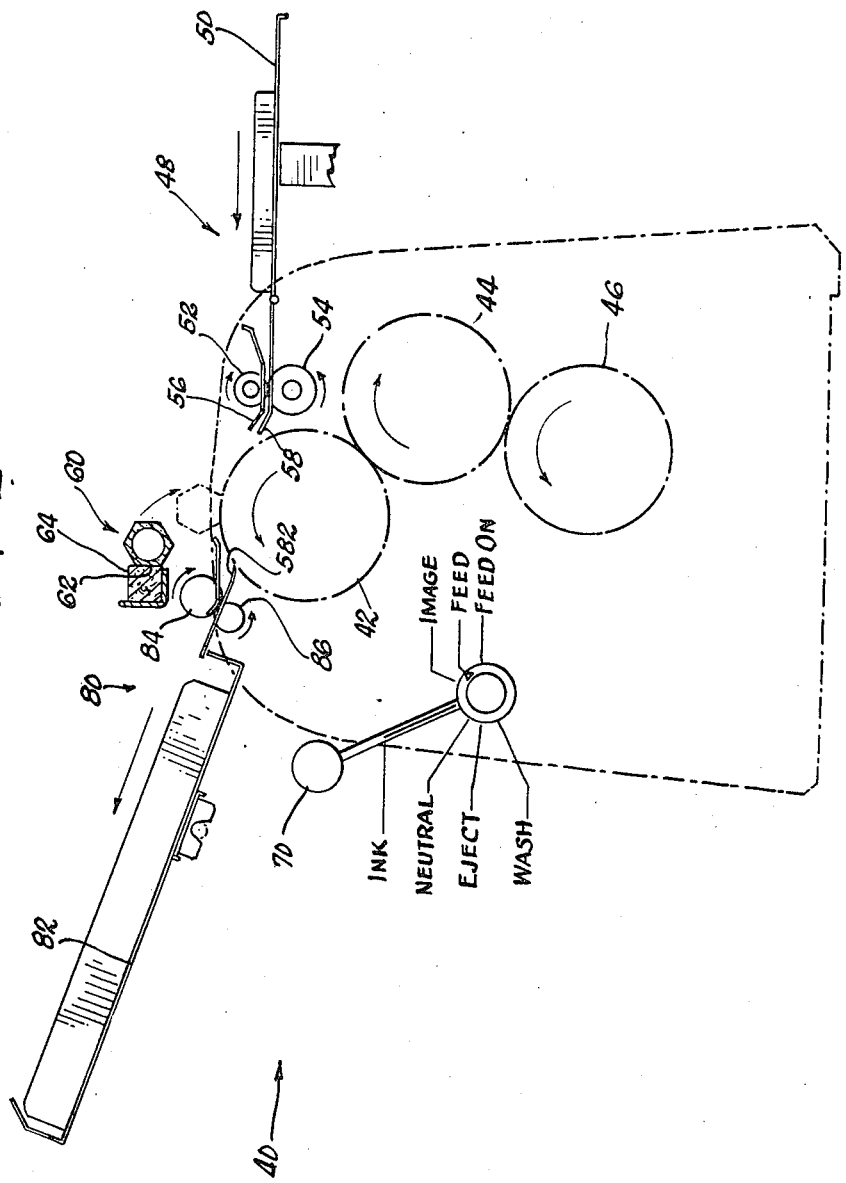

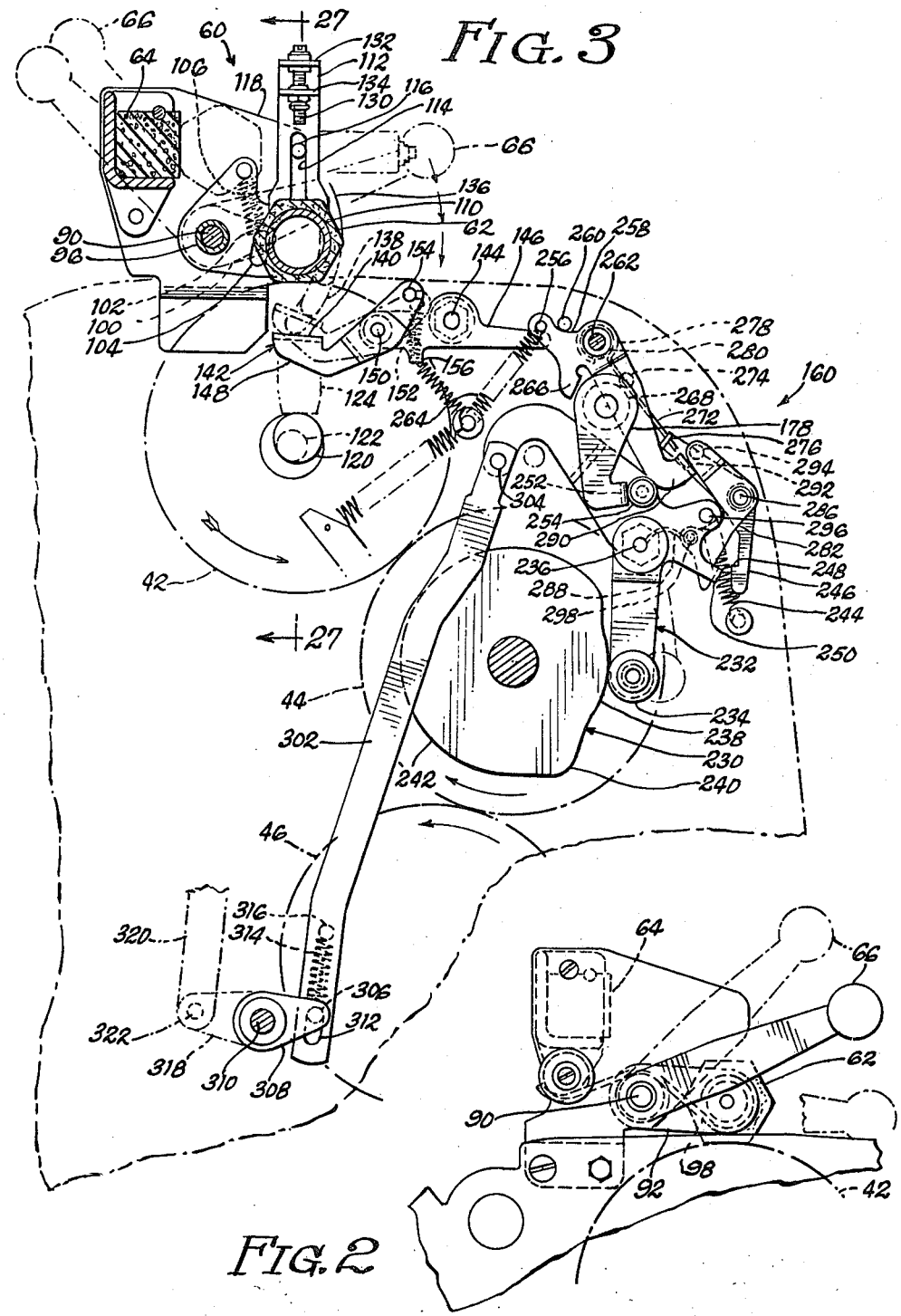

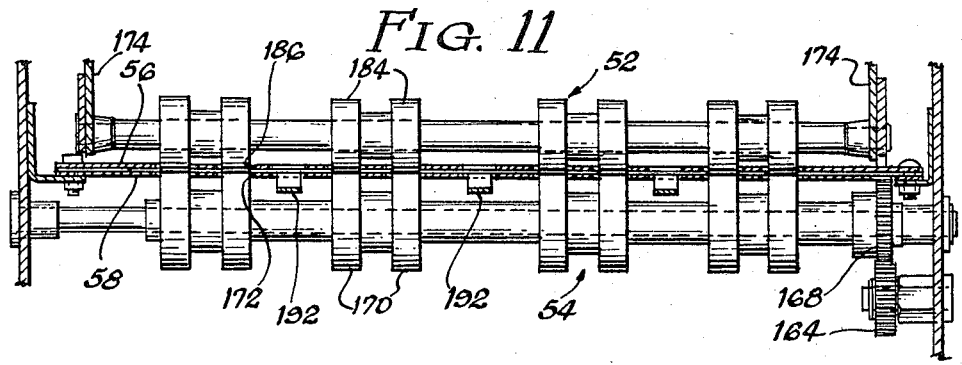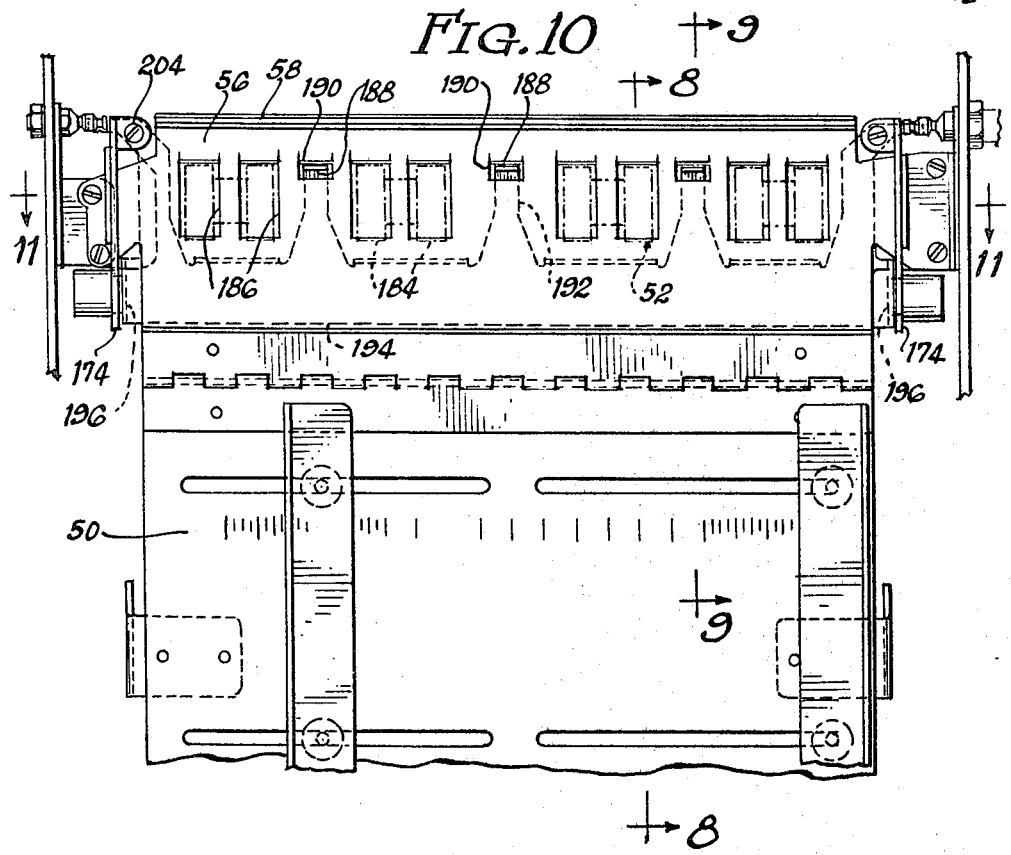

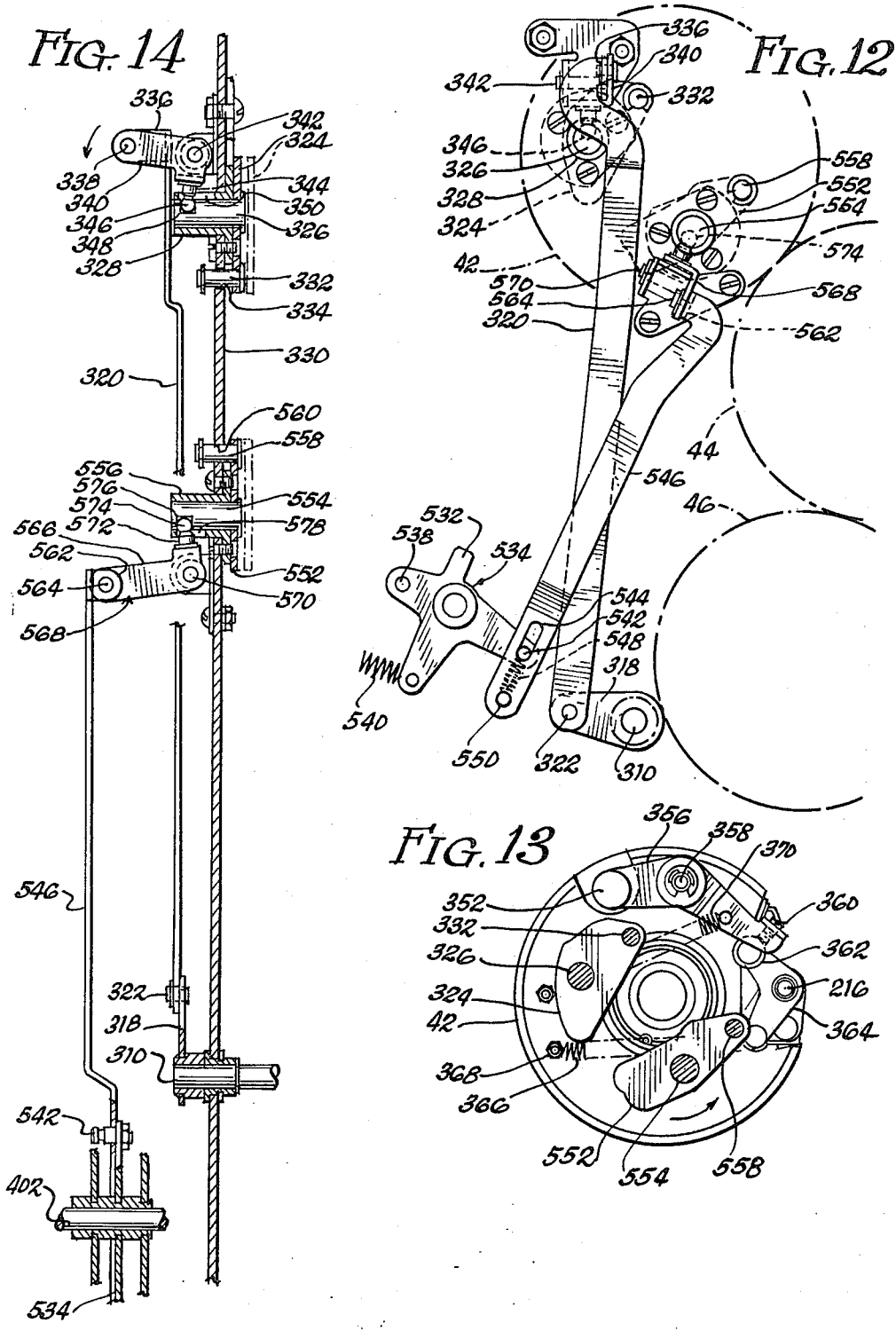

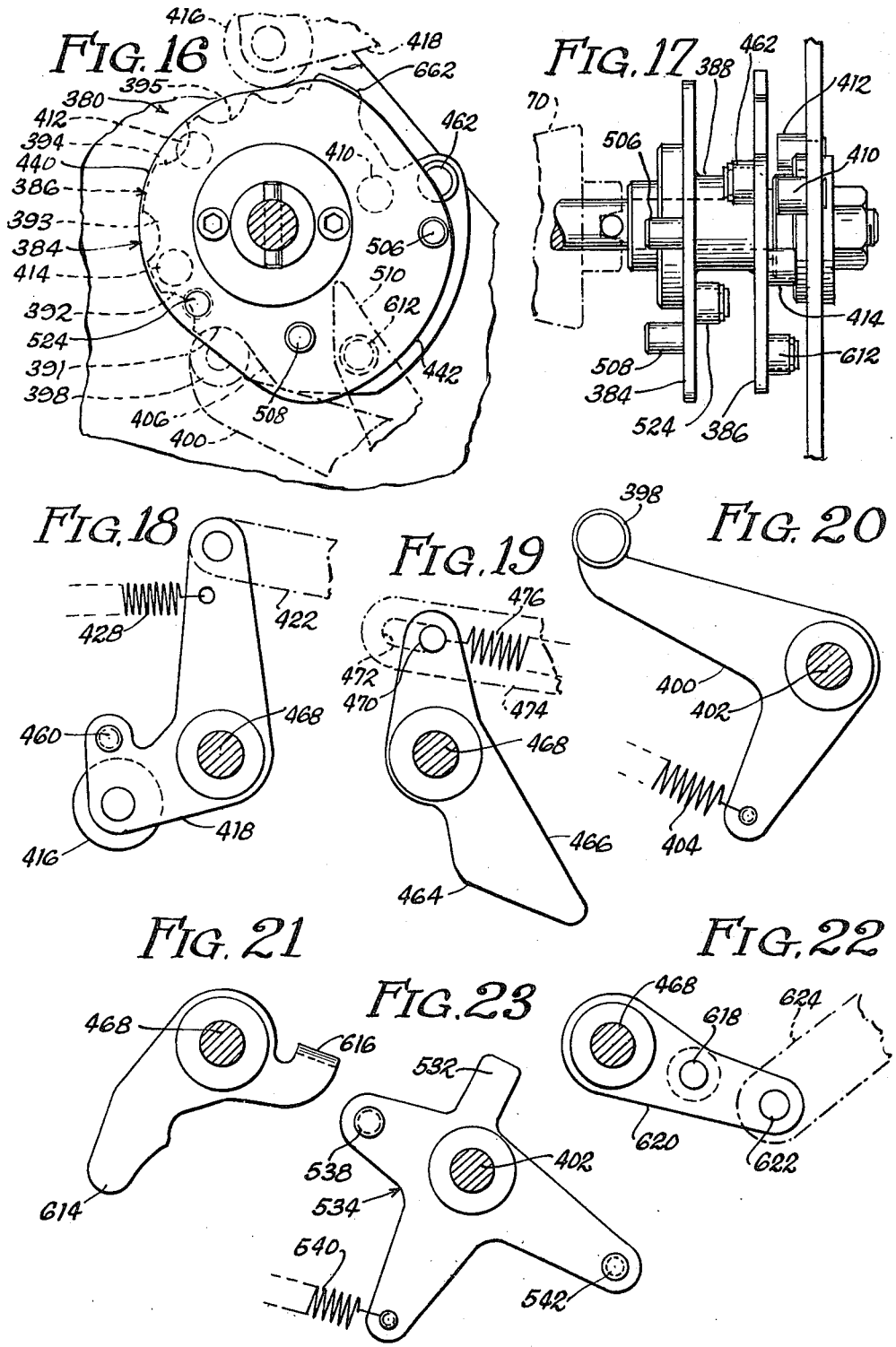

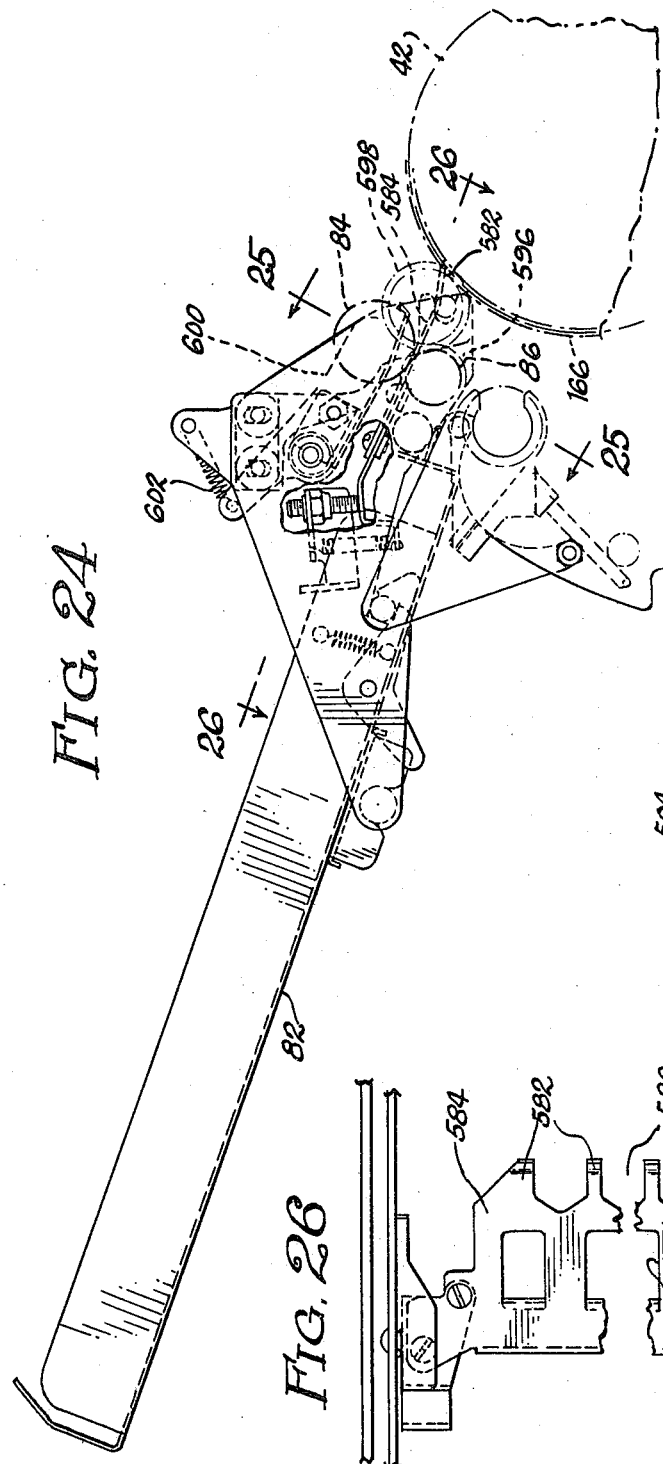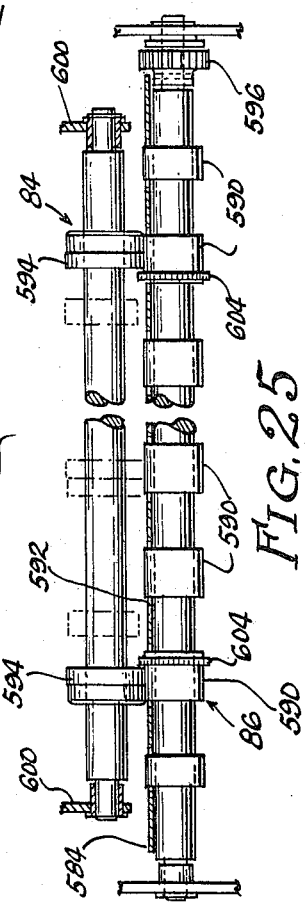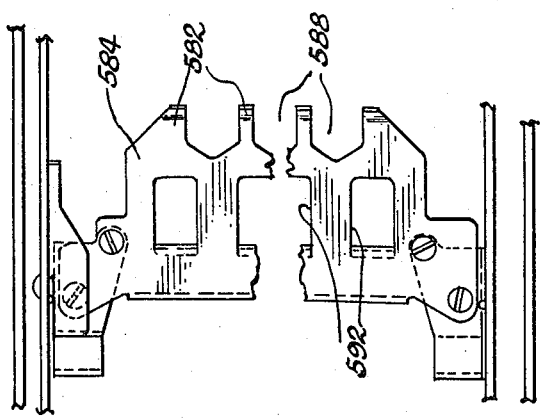

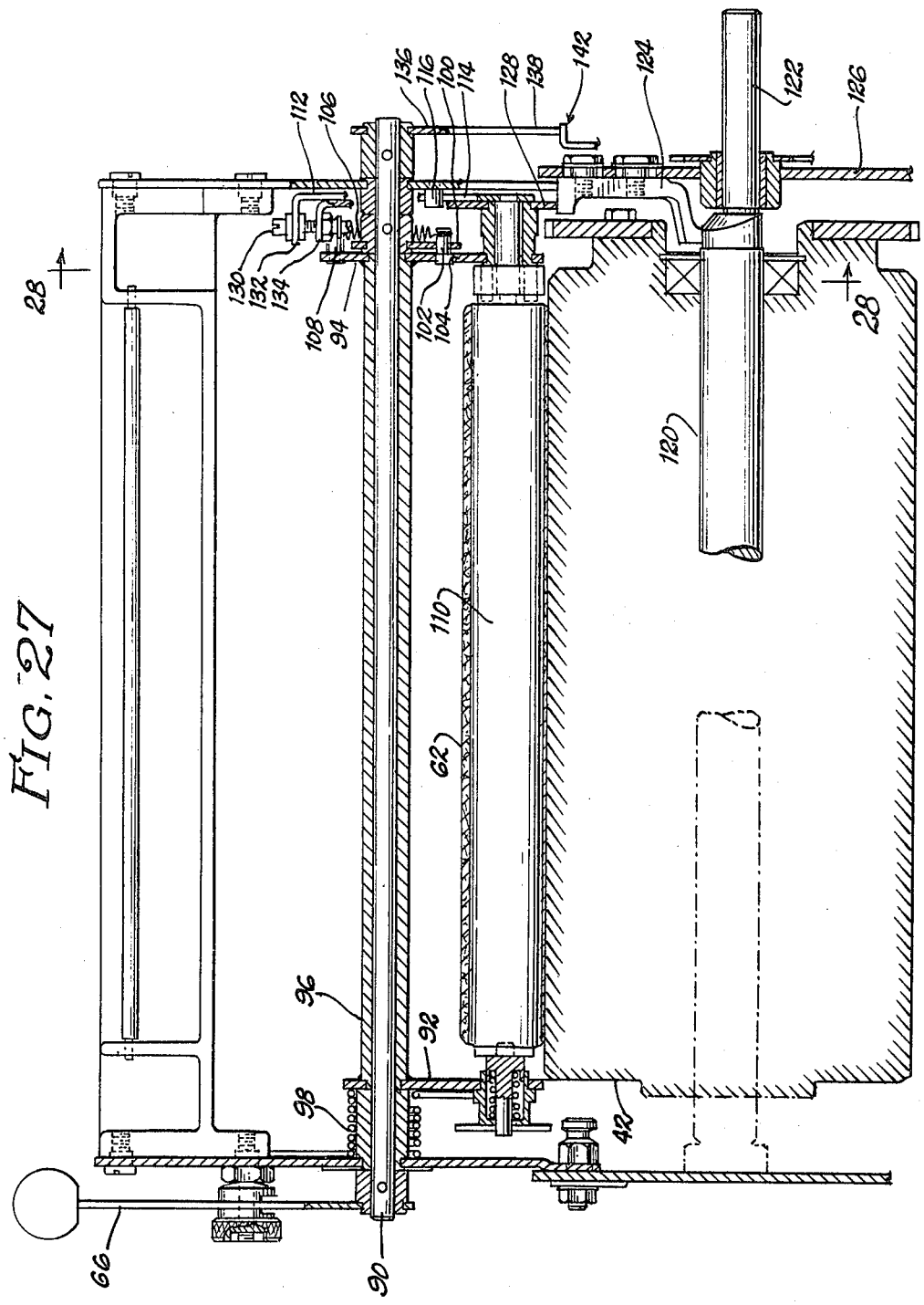

3,496,864
OFFSET DUPLICATING MACHINE WITH COMBINED CONTROL MECHANISM FOR ETCH APPLICATOR AND MASTER LOADING MECHANISM
Kenneth J. Tonkin, Glenview, John L. Swanson, Libertyville, and Richard R. Jeschke, Niles, Ill., assignors to A. B. Dick Company, Niles, Ill., a corporation of Illinois
Continuation of application Ser. No. 384,859, July 24, 1964, now Patent No. 3,431,841, dated Mar. 11, 1969. This application July 27, 1967, Ser. No. 656,425
Int. Cl. B41f 7/08
U.S. Cl. 101—142
7 Claims

ABSTRACT OF THE DISCLOSURE

A duplicating machine, comprising a master cylinder, means for continuously rotating the cylinder, a clamp on the cylinder for holding a master, a selectively operable master feed mechanism for feeding a new master to the cylinder, an etch applicator for applying an etching liquid to the master, a control lever, means operable by movement of the lever for actuating the etch applicator, a timing mechanism for operating the master feed mechanism and opening the clamp in timed relation to the rotation of the master cylinder, and means operable by movement of said control lever for initiating the operation of said timing mechanism, whereby the new master is fed to the cylinder, and whereby the etching liquid is immediately applied to the new master.

---

This application is a continuation of our co-pending application, Ser. No. 384,859, filed July 24, 1964, now Patent No. 3,431,841.

This invention relates to duplicating machines and printing presses in general, and particularly to offset duplicating machines. Such offset machines normally use the lithogrophic process and involve a transfer or offsetting of the printed impression from the lithographic printing plate or master sheet to a rubber blanket, which in turn transfers the printed impression to a copy sheet.

One principaly object of the present invention is to provide an offset duplicating machine in which the various mechanisms of the machine are automatically controlled and coordinated in a new and improved manner, so that the machine may be operated with much greater speed and facility, while the possibility of human error is greatly reduced.

A further object of the present invention is to provide a new and improved lithographic offset duplicator which includes a master loading mechanism, for automatically feeding a new master or printing sheet to the master cylinder of the machine, together with an etch applicator which is coordinated with the master loading mechanism, so that the operation of the master loading mechanism is automatically initiated when the etch applicator is operated. This novel construction insures that the etching solution will be applied to each new master as soon as it is loaded onto the master cylinder, so that the master will be properly prepared for inking.

Further objects and advantages of the present invention will appear from the following description, taken with the accompanying drawings, in which:

FIG. 1 is a diagrammatic side elevational view of a lithographic offset duplicator to be described as an illustrative embodiment of the present invention.

FIG. 2 is a fragmentary side elevational view showing the etch applicator employed on the duplicator of FIG. 1.

FIG. 3 is a diagrammatic elevational section showing the automatic control mechanism whereby the operation of the etch applicator initiates the operation of the master loading mechanism, whereby a new master is fed to the master cylinder.

FIG. 10 is a somewhat diagrammatic plan view of the master feed mechanism with the upper feed roller removed.

FIG. 11 is a sectional view showing the master feed rollers and taken generally along the line 11—11 in FIG. 10.

FG. 12 is a diagrammatic elevational view of the mechanisms for opening the master clamp on the master cylinder during the master loading and ejecting operations.

FIG. 13 is an end view of the master cylinder, showing the adjacent plunger cams for selectively opening the master clamp.

FIG. 14 is a stretched out diagrammatic sectional view taken through the mechanism shown in FIG. 12.

Figure 15:
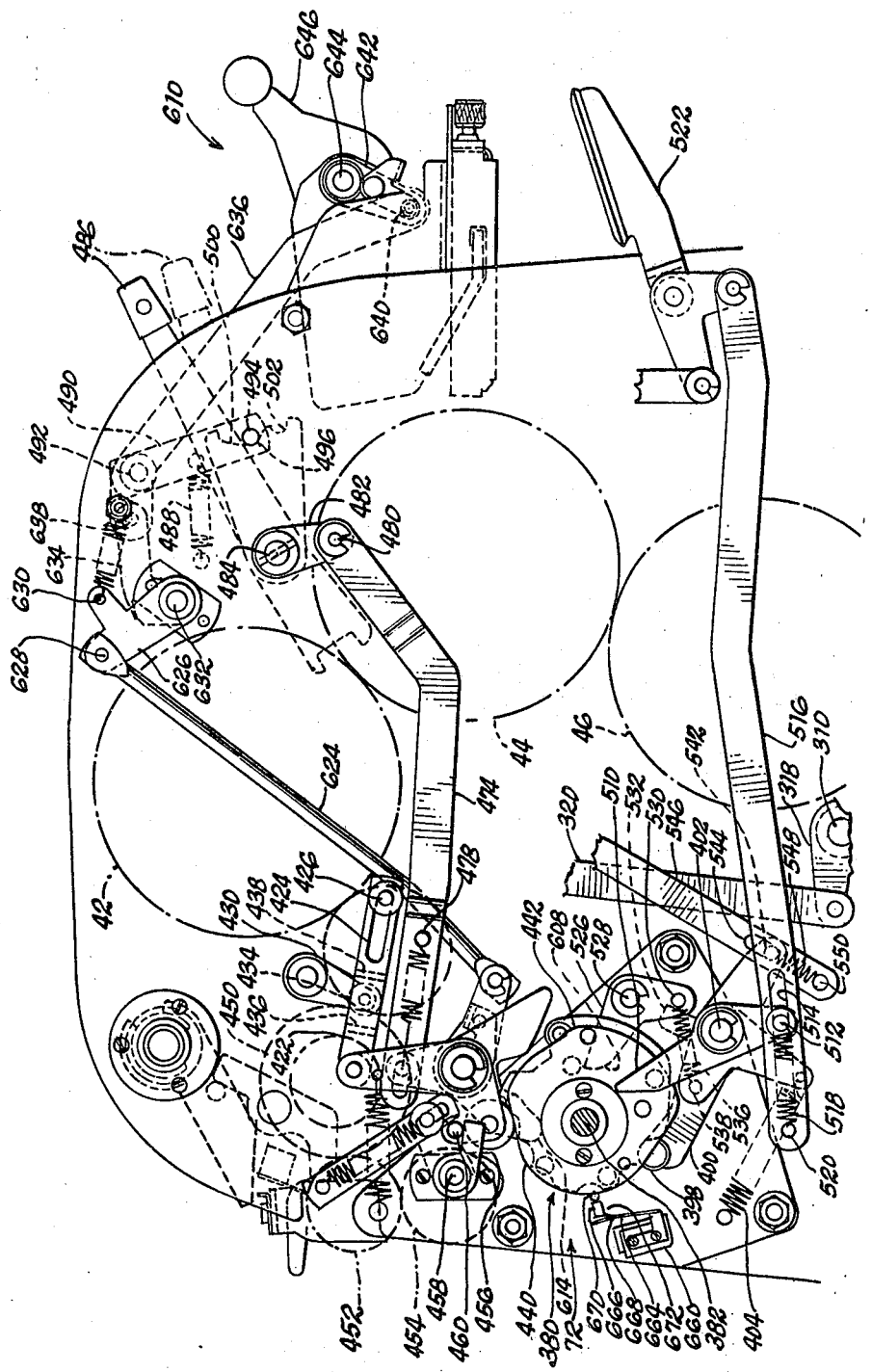

FIG. 15 is a diagrammatic side elevational view showing the control mechanism which is operated by the single control lever, to coordinate the operations involved in starting and terminating the printing operation.

FIG. 16 is an enlarged diagrammatic view of the cam cluster which is operated by the single control lever.

FIG. 17 is an edge view of the cam cluster.

FIGS. 18–23 are elevational views of various control levers operated by the cam cluster. Specifically, FIG. 18 illustrates the control lever for the inking and dampening mechanism; FIG. 19, the control lever to cause the image to be developed on the blanket; FIG. 20, the detent lever; FIG. 21, the blanket washer pawl; FIG. 22, the blanket washer lever, operable by the pawl; and FIG. 23, the master eject control lever.

FIG. 24 is a diagrammatic side elevational view of the mechanism for receiving the master as it is ejected from the master cylinder.

FIG. 25 is a diagrammatic sectional view showing the rollers for propelling the ejected master, the view being taken generally along the line 25—25 in FIG. 24.

FIG. 26 is a diagrammatic view showing the stripper plate for stripping the ejected master from the master cylinder, the view being taken generally as indicated by the line 26—26 in FIG. 24.

FIG. 27 is a fragmentary stretched out sectional view taken generally along the line 27—27 in FIG. 3.

Figure 28:
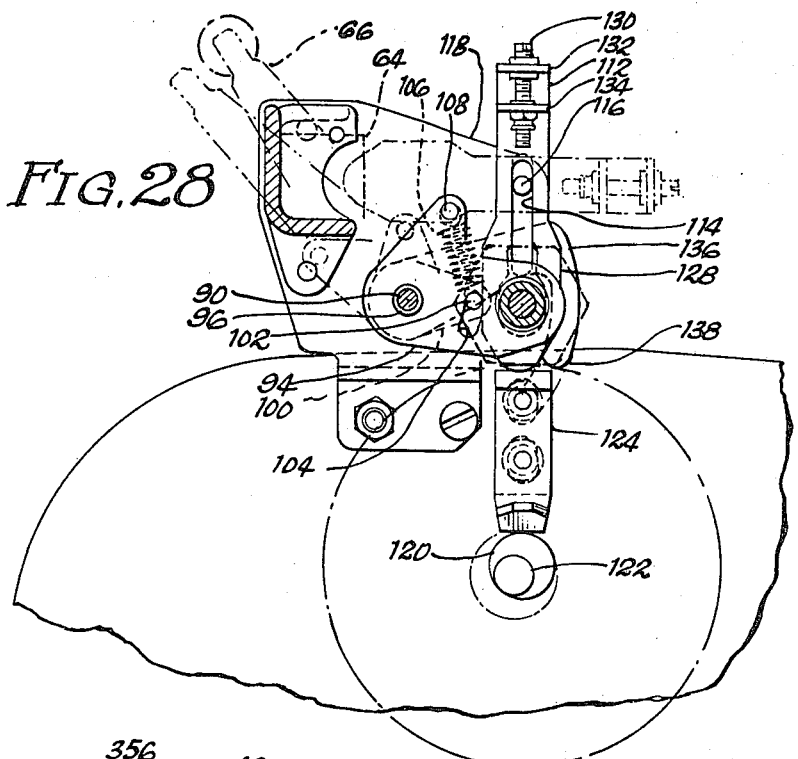

FIG. 28 is a sectional view taken generally along the line 28—28 in FIG. 27.

Figure 29:
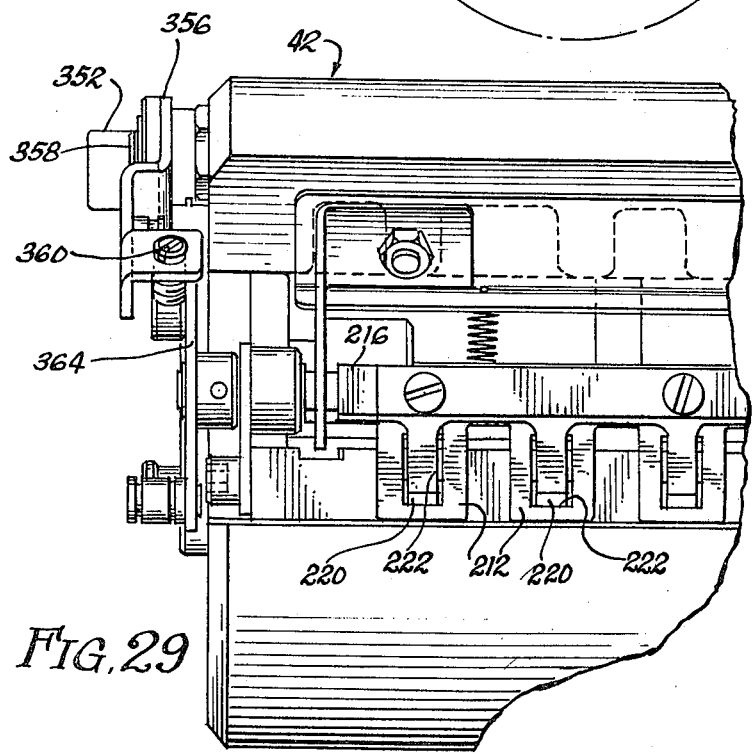

FIG. 29 is a fragmentary elevational view of the master cylinder, showing the gripper construction.

The present invention will be described as embodied in a lithographic offset duplicator or printing press 40, illustrated diagrammatically in FIG. 1. This machine is of the three-cylinder type, having a master cylinder 42, a blanket or offset cylinder 44, and an impression cylinder 46. The master cylinder 42 is adapted to carry the master or printing sheet, which is usually made of paper or thin sheet metal, such as aluminum. Normally, the machine uses the lithographic process, so that certain image areas of the master are adapted to accept lithographic ink. The non-image areas of the master are adapted to accept water or a water-base moistening solution, which repels the ink.

The ink applied to the master on the master cylinder 42 is transferred or offset to the rubber blanket on the blanket cylinder 44. Copy sheets, usually made of paper, are fed between the blanket cylinder 44 and the impression cylinder 46, so that the inked image on the blanket will be transferred to the copy sheets. Offset duplicators of this general construction are well known to those skilled in the art.

Other features of the offset duplicator 40 are also illustrated in FIG. 1. In accordance with one aspect of the present invention, the machine is equipped with a master loading mechanism 48 whereby a new master may be loaded onto the master cylinder 42 while the master cylinder continues to rotate at its normal speed. Thus, the master may be loaded onto the master cylinder without stopping the machine. A new master to be fed to the master cylinder 42 is placed on a master feed table 50. At the proper time, and under the control of the operator, the master is fed to the master cylinder by upper and lower feed rollers 52 and 54. The master is propelled between upper and lower guide plates 56 and 58. It will be seen that the lower guide plate 58 is an extension of the feed table 50. Further details of the master loading mechanism will be described presently.

The lithographic duplicator 40 is equipped with an etch applicator or mechanism 60 for applying an etching solution to the new master on the master cylinder 42, to prepare the master for the application of water and ink. In this case, the etch applicator 60 comprises a pad or wiper 62 which is movable between a sponge 64 and the surface of the master on the master cylinder 42. The sponge 64 serves as a reservoir to hold a supply of the etching solution. The illustrated pad 62 is of hexagonal shape so as to provide six working surfaces which may be used successively to prolong the life of the pad. The etch applicator 60 is provided with an actuating lever 66 which may be swung clockwise to move the pad 62 between the sponge 64 and the master cylinder 42. As will be described in detail shortly, the master loading mechanism 48 is tied in with the etch applicator 60 in such a way that the actuation of the control lever 66 initiates the operation of the master loading mechanism. This unified control arrangement insures that the etching solution will be applied to each new master, inasmuch as it is necessary to actuate the etch applicator in order to cause the new master to be loaded onto the master cylinder 42.

As described and claimed in said co-pending application, Ser. No. 384,859, the duplicator 40 has a control lever 70 which operates a control mechanism 72, to be described in detail presently. The control lever 70 is employed by the operator to carry out all of the functions which are necessary to initiate and terminate the printing of copy sheets from any particular master. It will be seen that the control lever 70 has seven positions. A normal starting position is designated Neutral. The control lever 70 should be in the Neutral position when the master loading mechanism 48 is actuated to load a new master onto the master cylinder 42. After the etching solution has been applied to the new master and the etch control lever 66 has been returned to its initial position, the control lever 70 is advanced one step in a clockwise direction to the position designated Ink. In this position, ink and water are applied to the master.

The control lever 70 is then advanced another step to the position designated Image. This movement of the control lever causes the master cylinder 42 to move into engagement with the blanket cylinder 44, so that ink is transferred to the rubber blanket to develop an inked image on the blanket.

Next, the control lever 70 is swung clockwise to the Feed position, and then is swung an additional amount to the Feed On position. Such operation of the control lever initiates the operation of the mechanism which feeds paper sheets between the blanket and impression cylinders 44 and 46. Such paper feed mechanisms are well known to those skilled in the art.

When the lever 70 is released, it does not stay in the Feed On position, but is resiliently returned to the Feed position, while the feed mechanism continues to operate. The lever 70 is left in the Feed position until the desired number of copy sheets have been printed. The lever 70 is then returned manually in a counterclockwise direction, through the Image and Ink positions to the Neutral position. The return movement to the Image position terminates the operation of the paper feed mechanism, if such operation has not already been terminated by an automatic counter or a separate manual control. The return of the lever 70 to the Neutral position cuts off the supply of ink and water to the master on the master cylinder 42. The master cylinder is also separated from the blanket cylinder 44.

Next, the control lever 70 is moved in a counterclockwise direction beyond the Neutral position to the next position, designated Eject. In this position, a master ejecting mechanism 80 is actuated, so as to eject the master from the master cylinder 42 and into a receiving tray 82. The master is propelled into the tray 82 by upper and lower forwarding rollers 84 and 86. Further details of the master ejecting mechanism 80 will be described presently.

The control lever 70 is then moved counterclockwise through another step to the Wash position, so as to actuate a blanket washing mechanism which washes the ink off the rubber blanket on the blanket cylinder 44. Such blanket washers are well known to those skilled in the art.

Finally, the control lever 70 is returned in a clockwise direction to the Neutral position, in preparation for the feeding of another new master to the master cylinder 42. In moving between the Wash and Neutral portions, the lever 70 passes through the Eject position, but the control mecranism 72 is constructed and arranged so as to avoid actuating the master ejecting mechanism during the clockwise movement of the control lever.

The duplicator 40 is constructed so that all of the functions of the machine may be carried out without stopping the machine. Thus, it is possible to change masters rapidly and to print the desired number of copy sheets from each successive master without stopping the machine at any time.

Other details of the etch applicator 60 are illustrated in FIG. 3. The control lever 66 is secured to a rotatable shaft 90 which extends transversely across the machine The hexagonal pad 62 is carried by a pair of arms 92 and 94 which are swingable about the axis of the shaft 90 but are secured to an elongated sleeve 96 which is rotatably mounted on the shaft 90. A spring 98 is provided to bias the pad 62 in a counterclockwise direction toward the sponge 64. In this case, the spring 98 is of the coiled torsional type.

The control lever 66 is connected to the supporting arm 94 for the pad 62 in such a manner as to provide a certain amount of lost motion between the lever and the pad, so that the lever can travel farther than the pad. Thus, an arm 100 is secured to the shaft 90 and is fitted with a pin 102 which is movable in an arcuate slot 104 formed in the arm 94, which is on the far side of the machine as viewed in FIGS. 2 and 3. A coiled tension spring 106 is connected between the pin 102 and a pin 108 mounted on the arm 94. Clockwise movement of the control lever 66 causes corresponding movement of the arm 100. The pull of the tension spring 106 causes the arm 94 to swing with the arm 100 until the pad 62 engages the master cylinder 42, whereupon the lever 66 may be swung an additional distance, until the pin 102 reaches the lower end of the slot 104.

The hexagonal pad 62 is mounted on a roller 110 which is rotatably supported on the arms 92 and 94. When the pad 62 is moved between the sponge 64 and the master cylinder 42, the roller 110 is rotated relative to the arms 92 and 94 so that the pad 62 will present the same surface to the sponge 64 and the master cylinder 42. For this purpose, an arm 112 is secured to the roller 110 adjacent the supporting arm 94. The arm 112 is formed with a longitudinal slot 114 which slidably receives a stationary pin 116, mounted on a stationary supporting plate 118. Thus, the arm 112 is caused to swing about the pin 116 when the hexagonal pad 62 is swung between the sponge 64 and the master cylinder 42. It will be observed that the pin 116 is located approximately at the intersection of perpendicular lines extending from the sponge 64 and the master cylinder 42. In this way, the same surface of the pad 62 is presented to both the sponge and the master cylinder.

During the operation of the duplicator, the master cylinder 42 is repeatedly moved toward and away from the blanket cylinder 44 by an automatic mechanism which is under the control of the feed mechanism for the paper sheets. The automatic mechanism is operative to hold the master cylinder against the blanket cylinder when paper sheets are being fed. Such arrangements will be familiar to those skilled in the art. The shifting movement of the master cylinder 42, toward and away from the blanket cylinder 44 occurs during the operation of the etch mechanism 60 and tends to interfere with the smooth and efficient application of the etching solution to the master. However, the present etch mechanism is constructed to obviate any such interference. In the illustrated machine, the master cylinder 42 is rotatable about a supporting shaft 120 which does not rotate with the cylinder but is disposed eccentrically with respect to its supporting pivots 122. The master cylinder 42 is moved into and out of engagement with the blanket cylinder 44 by turning the pivots 122 through a relatively small angle. An arrangement is provided whereby the etch applicator pad 62 will follow the shifting movement of the eccentric shaft 120, so that the pressure between the pad and the master will remain relatively constant. Thus, a follower bar 124 is slidably mounted on a frame plate 126 which constitutes the main left-hand frame plate of the machine. The lower end of the follower member 124 engages the eccentric shaft 120 so that the follower member moves up and down when the eccentric shaft is shifted up and down. The upper end of the follower member 124 is engaged by a stop member 128 which is movable with the etch applicator pad 62. In this case, the stop member 128 is in the form of a bar which is adjustably connected to the arm 112. Thus, an adjusting screw 130 is connected between flanges 132 and 134 on the upper ends of the arm 112 and the bar 128. It will be evident that the stop bar 128 may be adjusted upwardly and downwardly relative to the arm 112 and also relative to the pad 62. The adjustment of the stop bar 128 determines the extent to which the pad 62 may be moved downwardly before the stop bar 128 engages the upper end of the follower member 124.

The follower member 124 transmits the upward and downward movement of the eccentric shaft 120 to the stop bar 128 and thence to the pad 62, so that the pad is moved upwardly and downwardly with the shaft 120. This arrangement prevents any bouncing action between the pad 62 and the master cylinder 42. The pin 102 and the slot 104, together with the spring 106, accommodate the upward and downward movement of the pad 62.

It has already been indicated that the operation of the control lever 66 for the etch applicator 60 initiates the actuation of the master feeding mechanism 48, so that a new master sheet or printing plate is loaded onto the master cylinder 42. This tie-in is brought about by unified control means including the lever 66, and also other elements including an additional arm 136 which is secured to the shaft 90 on which the control lever 66 is mounted. The arm 136 is formed with a finger 138 which is movable downwardly into engagement with a flange 140 on a control lever 142. The arrangement is such that the control lever 142 is swung counterclockwise about its pivot 144 when the control lever 66 has been swung sufficiently in a clockwise direction to move the etch applicator pad 62 against the master cylinder 42. To provide for overtravel of the control lever 66 and the finger 138, the lever 142 is split into a main member 146, which is mounted on the pivot 144, and a left-hand arm member 148 on which the flange 140 is formed. The arm member 148 is connected to the main member 146 by a pivot 150. It will be seen that a spring 152 is connected between a pin 154 on the arm member 148 and an ear 156 on the main member 146. The spring 152 normally pulls the pin 154 against the main member 146. When the arm member 148 is swung counterclockwise by the finger 138, the spring 152 causes the main member 146 to swing with the arm member 148. However, the spring 152 makes it possible for the movement of the arm member 148 to exceed that of the main member 146.

The split control lever 142 is adapted to initiate the operation of a control mechanism 160 for the master loading mechanism 48. Before describing the details of the control mechanism 160, it will be helpful to describe the arrangement of the feed rollers 52 and 54 in greater detail, with particular reference to FIGS. 8 and 9.

The lower roller 54 is continuously driven by a suitable drive, which is illustrated as comprising an idler gear 164 which meshes with gears 166 and 168. The gear 166 is connected to the master cylinder 42, while the gear 168 is connected to the lower feed roller 54.

It will be seen that the lower feed roller 54 is divided into a plurality of narrow parts or sections 170 which project upwardly through slots 172 formed in the lower guide plate 58. The sections 170 are slightly below the upper surface of the guide plate 58.

Initially the upper feed roller 52 is raised to an inactive position, out of engagement with the lower feed roller 54, but the upper feed roller is movable downwardly to an active position in which the upper feed roller will press the new master sheet against the rotating lower feed roller 54 so that the master sheet will be propelled to the master cylinder 42. To provide for such movement, the upper feed roller 52 is mounted between a pair of swingable plates or frames 174 which are secured to a shaft 176 extending across the machine. A downwardly extending arm 178 is also mounted on the shaft 176 and is adapted to be operated by the control mechanism 160, in a manner to be described presently. The upper roller 52 is biased downwardly by springs 180 which are connected between the frame plates 174 and stationary pins 182. The upper feed roller 52 is also divided into parts or sections 184 which extend through slots 186 in the upper guide plate 56.

Initially, the new master to be fed to the master cylinder 42 is laid on the feed table 50 and is slid between the guide plates 56 and 58 until the leading edge of the master engages a plurality of stop fingers 188 which at this stage are projecting upwardly through slots 190 (FIG. 10) in the lower guide plate 58. The stops 188 insure that the master is accurately positioned. In this case, the stop fingers 188 project upwardly from arms 192 formed on a plate 194. Flanges 196 are formed on the plate 194 and are provided with openings 198 for loosely receiving the shaft 176. Thus, the stop fingers 188 are swingable about the axis of the shaft 176 but are not secured thereto. The stop plate 194 is biased upwardly by means of springs 200 which are connected to additional arms 202 on the stop plate.

Means are provided for moving the stop fingers 188 downwardly, out of the way of the master, when the upper roller 52 is moved downwardly to press the master against the lower roller 54. Thus, adjustable screws 204 are threaded through flanges 206 on the frame plates 174 and are engageable with the arms 202 on the stop plate 194. The screws 204 are adjusted so that the stops 188 will be moved below the upper surface of the guide plate 58 just before the upper feed roller 52 engages the master. The continuously driven lower roller 54 thereupon propels the master to the master cylinder 42.

Figure 8:
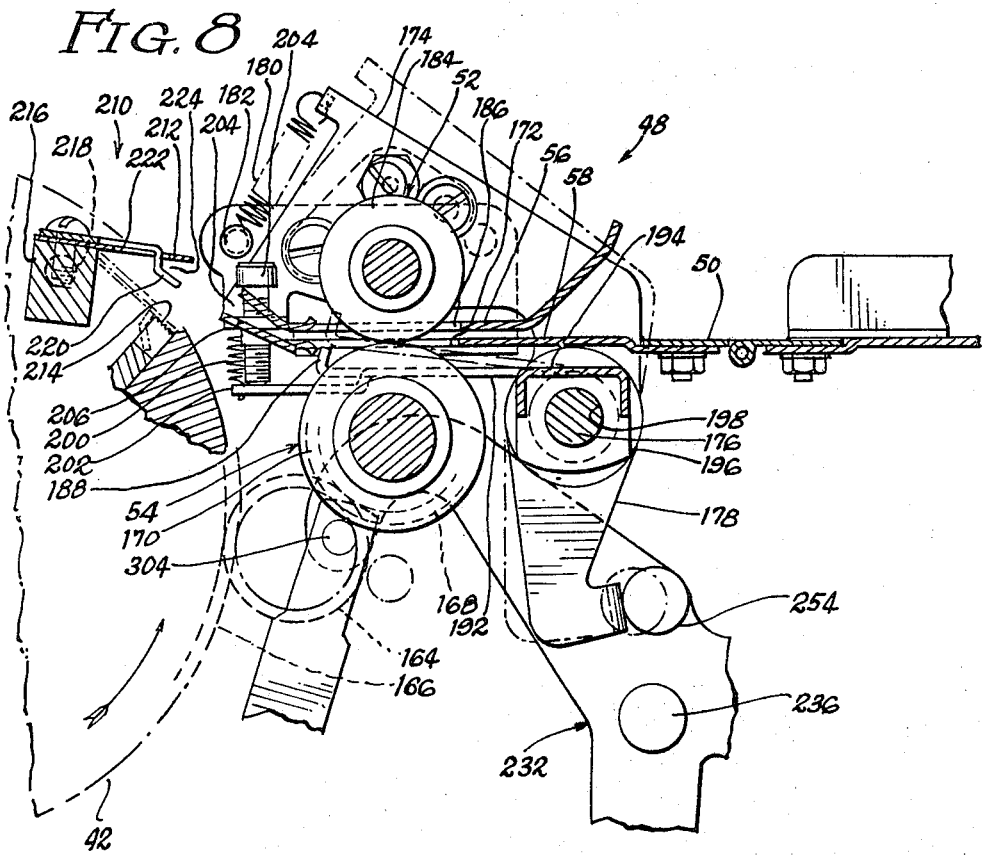
FIG. 8 is an elevational section taken through the master feeding mechanism, generally along the line 8—8 in FIG. 10.
Figure 9:
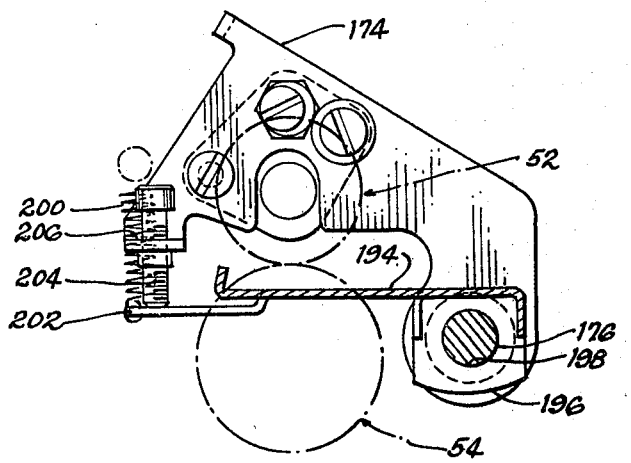
FIG. 9 is a fragmentary elevational section taken through the master feeding mechanism, generally along the line 9—9 in FIG. 10.

To hold the leading end of the master, the master cylinder 42 is provided with a clamp 210 comprising resilient gripper fingers 212 which are engageable with an anvil or bar 214 on the cylinder 42. The grippers 212 are mounted on a rectangular shaft or bar 216 which is rotatable about pivots 218. Ejection fingers 220 are also mounted on the shaft 216 and are arranged to extend inwardly through slots 222 in the grippers 212, so as to form a crotch 224 between the grippers 212 and the ejection fingers 220. The new master is fed into this crotch, so that the ejection fingers 220 also serve as stops to control the extent to which the master is fed into the grippers. The grippers 212 are open, as shown in FIG. 8, when the master is fed into the crotch 224. Shortly thereafter, the grippers are closed so as to press the master against the anvil 214. The mechanism for opening and closing the grippers will be described in detail presently.

The control mechanism 160 is adapted to operate the arm 178 so as to drop the upper rollers 52 against the master, in timed relation to the rotation of the master cylinder 42, so that the master will be fed into the grippers 212 on the cylinder. To accomplish the desired timing, the power for operating the control mechanism 160 is derived from a cam 230 which is connected to the blanket cylinder 44 so as to rotate continuously therewith. It will be understood that the master and blanket cylinders 42 and 44 are geared together so that the rotation of the cam 230 will be in a predetermined timed relation to the rotation of the master cylinder 42.

The cam 230 is adapted to operate a power lever 232 having a cam follower roller 234 thereon for engaging the cam 230. The lever 232 is swingable about a pivot 236. In FIG. 3, the roller 234 is shown on the low part 238 of the cam 230. In this case, the cam 230 also has a high part or lobe 240 and an intermediate part 242. A spring 244 biases the lever 232 in a clockwise direction and thus tends to maintain the roller 234 in engagement with the cam 230.

Initially, before the control lever 66 is actuated, the cam follower lever 232 is latched in an inactive position by a primary latching lever 246 having a pawl or shoulder 248 which is adapted to hook on to a latching ear or flange 250 on the lever 232. In FIG. 3, the latching lever 246 is shown in the unlatched position. When the lever 232 is latched, only the high point 240 of the cam 230 engages the roller 234. The high point 240 moves the lever 232 a small amount in a counterclockwise direction so as to relieve the pressure between the ear 250 and the latching shoulder 248. When the pressure is thus relieved, the latching lever 246 may be swung counterclockwise to its unlatched position, as shown in FIG. 3. The roller 234 then rides down the cam 230 to the low part 238, with the result that the lever 232 is swung in a clockwise direction. Such movement of the lever 232 has the effect of dropping the upper feed rollers 52 onto the master so that it will be fed to the master cylinder 42. Thus, the arm 178, shown in both FIG. 3 and FIG. 8, is formed with a flange or shoe 252 which is engageable with a roller 254 on the follower lever 232. The springs 180 bias the arms 174 and 178 in a counterclockwise direction and thus tend to maintain the flange 252 against the roller 254. When the lever 232 swings clockwise, the flange 252 follows the roller 254 so that the arm 178 swings counterclockwise. Thus, the master is fed to the master cylinder 42. In a manner to be described presently, the follower lever 232 also operates a mechanism which opens the grippers 212 on the master cylinder. The manner in which the latch 246 is unlatched will now be described.

Figure 4:
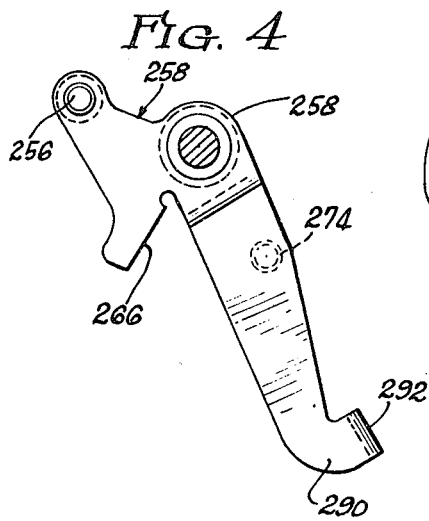
FIGS. 4–7 are elevational views showing a latch-operating lever, a primary latch, a secondary latch, and a cam follower, respectively, employed as components in the control mechanism of FIG. 3.
Figure 7:
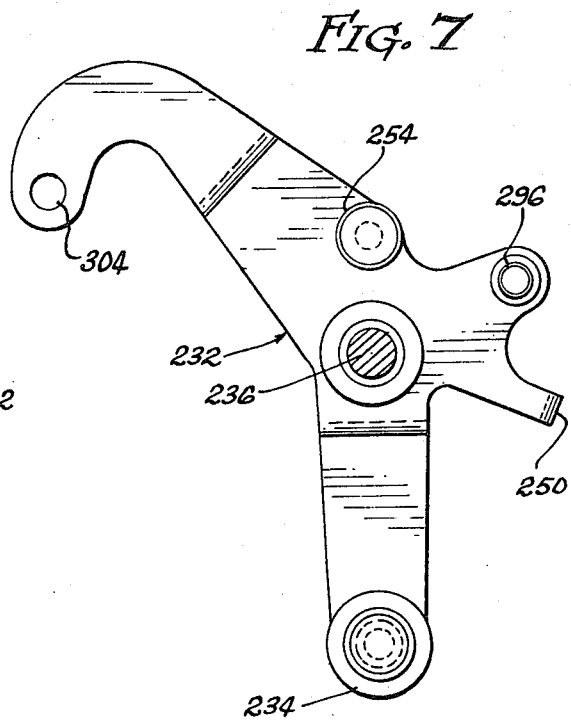

This is brought about by the counterclockwise movement of the split lever 142 when such lever is actuated by the finger 138 connected to the control lever 66, as previously described. The right-hand end of the main member 146 of the split lever 142 is engageable with a pin 256 on a latch-operating lever 258, shown in FIG. 4, as well as in FIG. 3. When the lever 142 is swung counterclockwise, the lever 258 is sung clockwise until it engages a stationary stop pin 260. The latch-operating lever 258 is swingable about a pivot 262 and is biased in a counterclockwise direction by a spring 264. It will be seen that the lever 258 has an arm 266 which is engageable with a hub or bushing 268 to limit the counterclockwise movement of the lever and thereby establish the initial position thereof.

A spring 270 is provided to bias the main member 146 of the split lever 142 in a counterclockwise direction, so that the right-hand end of the member 146 will be urged against the pin 256. However, the spring 270 is not strong enough to move the lever 258 against the biasing action of its return spring 264.

It will be seen that an elongated wire spring 272 is connected between the latch-operating lever 258 and the primary latching lever 246. The wire spring 272 extends through an apertured pin 274 on the operating lever 258, and also through an apertured lug or flange 276 on the upper end of the latching lever 246. The spring 272 has an upper end portion 278 which is wrapped or looped around the hub 280 of the lever 258.

Figure 6:
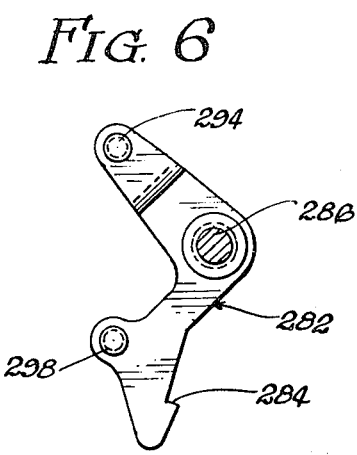
Figure 5:
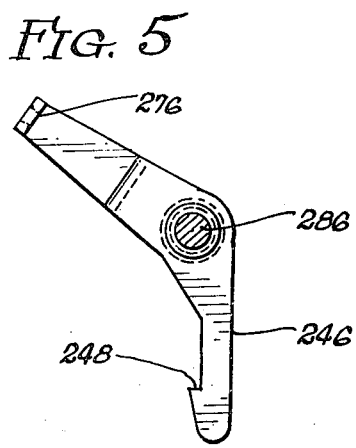

When the latch-operating lever 258 is swung clockwise, the wire spring 272 tends to swing the primary latching lever 246 counterclockwise. However, the resilient action or force of the spring 272 is not sufficient to unlatch the lever 246 until the pressure is relieved between the latching shoulder 248 and the ear 250. It will be recalled that such pressure is relieved when the high point 240 of the cam 230 passes the roller 234. The latching lever 246 then snaps to the position shown in FIG. 3. After the cam 230 has rotated through one revolution, the lever 232 is returned to its initial position by the high point 240 of the cam, whereupon the lever 232 is relatched so that it will not continue to follow the cam. The relatching is normally accomplished by a secondary latching lever 282, which is shown in FIG. 6 as well as in FIG. 3. It will be seen that the lever 282 has a latching pawl or shoulder 284 which is engageable with the ear 250. The lever 282 is swingable about a pivot 286, about which the primary latch 246 is also swingable, independently of the lever 282. When the relatching occurs, the secondary latching lever 282 is biased into its latching position by an over-center spring 288.

The secondary latching lever 282 remains in engagement with the ear 250 until the operating lever 66 is released, whereupon the latch-operating lever 258 returns in a counterclockwise direction toward its initial position. The wire spring 272 then swings the primary latch 246 in a clockwise direction so that it tends to move into latching engagement with the ear 250. It will be seen that the latching lever 258 has an arm 290 which is formed with a flange 292 adapted to engage a pin 294 on the secondary latching lever 282. Thus, the counterclockwise return movement of the latch-operating lever 258 tends to move the secondary latching lever 282 out of latching engagement with the ear 250. However, the return spring 264 is not strong enough to move the secondary latching lever 282 until the latching pressure is relieved between the ear 250 and the latching shoulder 284. Such latching pressure is relieved when the follower lever 232 is moved to a slight extent in a counterclockwise direction by the high point 240 of the cam. At this instant, the secondary latching lever 282 moves out of latching engagement with the ear 250, while the primary latching lever 246 moves back into latching engagement with the ear 250.

The clockwise unlatching movement of the secondary latching lever 282 causes the spring 288 to move over-center, so that it now biases the secondary latching lever 282 in a clockwise direction, away from the ear 250. The secondary latching lever 282 remains in this position until the lever 232 is again unlatched. When the lever 232 swings clockwise, the secondary latching lever 282 is engaged by a pin 296 on the lever 232. In this way, the lever 282 is swung counterclockwise, whereupon the spring 288 again moves over-center. In this case, the spring 288 is of the hairpin compression type and is connected between the fixed pivot or pin 236 and the pin 298 on the secondary latching lever 282.

As already indicated, the control mechanism 160 also comprises means for opening the grippers 212 on the master cylinder 42 in the proper timed relationship to the feeding of the new master sheet, so that the master will be fed into the crotch 224 of the grippers. To operate the grippers, an elongated link 302 is connected to the cam follower lever 232 by means of a pin 304. The link 302 extends downwardly and is connected to a pin 306 on an arm 308 which is secured to a shaft 310 extending transversely across the machine. To allow for lost motion, the link 302 is formed with a slot 312 which receives the pin 306. A spring 314 is stretched between the pin 306 and another pin 316 which is mounted on the link 302 and is spaced upwardly from the pin 306. The spring 314 tends to keep the pin 306 at the upper end of the slot 312.

The shaft 310 extends between the far or left-hand side and the near or right-hand side of the machine. With reference to FIG. 3, the arm 308 is on the far end of the shaft 310. Another arm 318 is mounted on the near end of the shaft 310 and is connected to a link 320 by means of a pin 322. The arm 318 and the link 320 are shown in FIG. 12, as well as in FIG. 3.

The link 320 is adapted to operate a movable plunger cam 324, shown in FIGS. 12–14. The cam 324 is in the form of a plate of irregular shape, secured to the inner end of a pin or shaft 326 which is slidable within a stationary guide sleeve 328. It will be seen that the guide sleeve 328 is mounted on the near or right-hand frame plate 330 of the machine. A second pin 332 is secured to the cam plate 324 and is slidably received in an opening 334 formed in the frame plate 330.

The upper end of the link 320 is formed with an outwardly projecting flange or lug 336 which is connected by means of a pin 338 to an L-shaped lever 340, swingable about a pivot 342. The lever 340 has a downwardly extending arm 344 which is provided with a ball-shaped end portion 346. A socket 348 is formed in the upper side portion of the pin 326 to receive the ball 346. The arm 344 extends through a slot 350 in the guide sleeve 328.

In FIG. 14, the cam 324 is shown in full lines in its inactive position, in which the cam is moved toward the rear side of the frame plate 330. The cam 324 is moved to this position by counterclockwise movement of the cam follower lever 232. The active position of the cam is shown in broken lines.

In its active position, the cam 324 is adapted to be engaged by a follower roller 352 (FIG. 13) carried by one end of a lever 356 on the master cylinder 42. The follower lever 356 is swingable about a pivot 358 on the master cylinder 42. The other end of the lever 356 is fitted with an adjusting screw 360 which is engageable with a roller 362 carried by a lever 364 on the gripper shaft 216. It will be recalled that the gripper shaft 216 is also shown in FIG. 8, as well as FIG. 13. To close the grippers 212, a spring 366 is connected between the lever 364 and a pin 368 on the master cylinder 42. Another spring 370 is provided to bias the follower lever 356 in a clockwise direction so as to urge the adjusting screw 360 against the roller 362. The spring 366 is strong enough to overcome the spring 370 and to hold the grippers 212 firmly closed.

When the cam 324 is moved into the path of the roller 352, the grippers 212 are opened as they pass the master feeding mechanism 48. The rollers 52 and 54 feed the master into the crotch 224 of the grippers. The roller 352 then rides off the cam 324, so that the grippers 212 are closed upon the leading edge of the master. By the time the master cylinder 42 has completed another revolution, the cam 324 is moved out of the path of the roller 352 by the counterclockwise movement of the cam follower 332. When the follower 332 is latched in its inactive position by either of the latches 246 and 282, the cam 324 is out of the path of the roller 352.

It will be recalled that the etch applicator 60 is effective to apply an etching solution to the new master after it has been loaded onto the master cylinder 42. The other functions which are necessary to commence the printing operation are controlled by the control lever 70, which operates the control mechanism 72. Details of the control mechanism 72 are shown in FIGS. 15–23. The control lever 70 is connected to a cam cluster or assembly 380 which is rotatable about a pivot or shaft 382. It will be seen that the cam cluster 380 comprises a control cam 384 and a detent cam 386 which are secured together by means of a hub or spacer 388. In FIGS. 15 and 16, the cam cluster 380 is shown in the position which it occupies when the control lever 70 is in the Feed position. The detent cam 386 is formed with a series of detent notches 391, 392, 393, 394, 395 and 396 which correspond to the Feed, Image, Ink, Neutral, Eject and Wash positions of the control lever 70.

The detent cam 386 is engaged by a roller 398 carried by a follower lever 400 which is swingable about a pivot 402. A spring 404 is provided to bias the lever 400 in a clockwise direction so that the roller 398 will be held against the detent cam 386.

The detent notches 392–396 are generally semicircular to provide a definite detenting action in both directions, but the detent notch 391 has one side portion 406 which slopes gradually in an outward direction to provide a spring return action for the Feed On position. It will be recalled that the detent cam 386 is in the Feed position in FIGS. 15 and 16. When the cam 386 is turned clockwise to the Feed On position, the roller 398 rides up the inclined portion 406. When the control lever 70 is released, the spring 404 is effective to return the detent cam 386 to the Feed position.

The rotation of the cam cluster 380 is limited by two fixed stop pins 410 and 412 which are engageable by a stop pin 414 on the detent cam 386. The movable pin 414 engages the fixed pin 412 when the cam cluster 380 is swung clockwise to the Feed On position. When the cam cluster 380 is swung counterclockwise to the Wash position, the movable pin 414 engages the fixed pin 410.

The control cam 384 is engaged by a roller 416 which is carried by one end of an L-shaped lever 418, shown in FIG. 18, as well as FIG. 15. The other end of the lever 418 is connected by means of a pin 420 to a link 422. As shown in FIG. 15, the link 422 is formed with a slot 424 in which a fixed pin 426 is slidably received. Thus, the swinging movement of the lever 418 causes the link 422 to slide along the pin 426. A spring 428 is connected to the lever 418 to bias it counterclockwise so that the roller 416 will be held against the control cam 384.

The link 422 is adapted to operate a lever 430 which controls the application of ink to the master on the master cylinder 42. The ink is applied to the master cylinder by an inking system which includes a form roller 432 movable into and out of engagement with the master cylinder 42. Such ink systems are well known to those skilled in the art. When the lever 430 is swung clockwise, as shown in FIG. 15, the form roller 432 is moved into engagement with the master cylinder 42. When the lever 430 is swung counterclockwise, the form roller 432 is separated from the master cylinder 42. As shown, the lever 430 carries a roller 434 which is adapted to be engaged by a pair of spaced flanges 436 and 438 on the link 422.

In FIG. 15, the roller 416 is on the low portion 440 of the control cam 384. The cam 384 has a high portion 442 which engages the roller 416 when the cam 384 is rotated to the Neutral position. Thus, the lever 418 is swung clockwise so as to move the link 422 to the right. Such movement of the link 422 causes the flange 436 to engage the roller 434 so as to shift the lever 430 in a counterclockwise direction. Thus, the form roller 432 is moved away from the master cylinder 42.

The lever 418 is also employed to control the application of water or repellant solution to the master on the master cylinder 42. The water is applied to the master by the form roller 432 which receives the water from an oscillating roller 450, which is one of the rollers of the inking system. The roller 450 oscillates longitudinally and is effective to spread the ink uniformly on the form roller 432. The water is applied to the oscillating roller 450 by a water ductor roller 452 which in turn receives the water from a fountain roller 454. In this case the ductor roller 452 continuously engages the fountain roller 454 but is moved into and out of engagement with the oscillating roller 450 in a cyclical manner. When it is desired to interrupt the supply of water to the form roller 432, the ductor roller 452 is held away from the oscillating roller 450. Such interruption of the supply of water is brought about by an arm 456 which is mounted on a shaft 458 and is adapted to be swung clockwise by a pin 460 on the lever 418. Thus, when the control cam 384 is moved between the Feed and the Image positions, the lever 418 is swung clockwise by an intermediate portion 461 on the cam 384. This swinging movement causes the arm 456 to swing counterclockwise, with the result that the supply of water to the form roller 432 is interrupted. When the cam 384 is moved between the Ink and Neutral positions, the lever 418 is swung an additional amount, so that the form roller 432 is separated from the master cylinder 42, as previously described.

When the printing operation is started, the control lever 70 is moved from the Neutral position to the Ink position. The cam 384 causes the lever 418 to swing counterclockwise and thereby causes the form roller 432 to move against the master cylinder 42. This position of the form roller is maintained when the lever 70 is moved to the Image, Feed and Feed On positions.

When the lever 70 is moved between the Image and Feed positions, the cam 384 causes the lever 418 to swing counterclockwise an additional amount, with the result that the arm 456 is swung clockwise, so as to start the application of water to the oscillating roller 450 by the ductor roller 452.

In the Image position, the master cylinder 42 is shifted so that the master engages the blanked cylinder 44. This causes an image of the master to develop on the blanket. The shifting of the master cylinder is brought about by a roller 462 which is mounted on the detent cam 386 and projects forwardly therefrom, as seen in FIGS. 16 and 17. When the detent cam 386 is moved to the Image position, the roller 462 engages a cam lobe 464 on a lever 466 and causes the lever 466 to swing counterclockwise about its pivot 468. The upper end of the lever 466 is provided with a pin 470 which is slidably received in a slot 472 formed in a link 474. A spring 476 is connected between the pin 470 and another pin 478 on the link 474. Normally, the spring 476 holds the right-hand end of the slot 472 against the pin 470. The spring 476 causes the link 474 to move to the left when the lever 466 is swung counterclockwise.

The right-hand end of the link 474 is connected by means of a pin 480 to an arm 482 which is mounted on a shaft 484. The shaft 484 also supports a control lever 486 which may be swung downwardly to operate a control mechanism which is effective to cause the master cylinder 42 to be shifted into engagement with the blanket cylinder 44.

To provide a spring return for the control lever 486, a spring 488 is connected to a detent arm 490 so as to bias the arm in a clockwise direction about its pivot 492. The arm 490 carried a detent pin 494 which initially engages a detent notch 496 in a detent arm 498 which is secured to the shaft 484. The notch 496 has one side portion 500 which slopes gradually in an outward direction, so that the camming action between the pin 494 and the sloping portion 500 tends to return the lever 486 to the Neutral position when the lever is swung clockwise. The detent arm 498 also has another notch 502 adapted to retain the pin 494 when the lever 486 is swung manually in a counterclockwise direction. Movement of the lever 486 in a counterclockwise direction from the Neutral position is effective to hold the master cylinder 42 away from the blanket cylinder 44.

When the control lever 70 is in the Image position, the lever 466 is swung counterclockwise so as to cause the master cylinder 42 to move into engagement with the blanket cylinder. When the control lever 70 is in the Feed and Feed On positions, the movement of the master cylinder, into and out of engagement with the blanket cylinder, is controlled automatically by the paper feed mechanism, in a manner that will be familiar to those skilled in the art. When the feeding of the paper sheets is terminated, the master cylinder is separated from the blanket cylinder.

The movement of the control lever 70 to the Feed On position starts the operation of the feed mechanism for the paper sheets. The operation of the feed mechanism continues when the lever 70 is allowed to return to the Feed position. When the lever 70 is returned to the Image position, the feed mechanism is automatically turned off.

The functions of turning the feed mechanism on and off are controlled by pins 506 and 508 projecting forwardly from the control cam 384. The pins 506 and 508 are engageable with the opposite edges of a lever 510 which is swingable about the pivot 402 which also supports the detent lever 400, as already described. The lower end of the lever 510 is fitted with a pin 512 which is slidably received in a slot 514 formed in an elongated link 516. A spring 518 is connected between the pin 512 and another pin 520 on the link 516. The righthand end of the link 516 is connected to a hand lever 522 which controls the operation of the paper feed mechanism. Such control arrangements will be familiar to those skilled in the art. When the lever 522 is swung upwardly, the operation of the paper feed mechanism is started, so that paper sheets are fed between the blanket and impression cylinders 44 and 46. Such movement of the lever 522 is caused by the pin 506 when it engages the lever 510 and swings it in a counterclockwise direction. The lever 522 is detained in its raised position by a detent mechanism embodied in a paper feed mechanism, not shown.

The lever 510 is shown in FIG. 15 in its actuated position, in which the feed is On. When the control lever 70 is moved from the Feed position to the Image position, the pin 508 engages the lever 510 and swings it in a clockwise direction to its inactive position in which the feed is off. The lever 510 is then out of the path of the pin 508 so that the pin is able to pass the lever without interference. It will be noted that the pin 508 is at a smaller radial distance from the axis of the cam cluster 380 than is the pin 506. Thus, the lever 510 is still in the path of the pin 506 when the lever 510 is in its inactive position.

After the control lever 70 has been returned to its Neutral position, it is swung counterclockwise to the Eject position so as to eject the master from the master cylinder 42. This function is controlled by a roller 524 projecting rearwardly from the control cam 384. As the roller 524 moves to the Eject position, it engages and swings a lever or pawl 526 in a clockwise direction about its pivot 528. The lever 526 carries a pin 530 which is engageable with an upwardly extending arm 532 on a four-armed lever 534, shown in FIG. 23 as well as FIG. 15. The clockwise movement of the lever 526 causes counterclockwise movement of the lever 534. A spring 536 is stretched between the pin 530 and another pin 538 on the lever 534 to bias the pin 530 against the arm 532.

The lever 534 is biased in a clockwise direction by a spring 540. The lever 534 carries another pin 542 which extends through a slot 544 in a link 546. A spring 548 is connected between the pin 542 and a pin 550 on the link 546.

It will be seen that the lever 534 and the link 546 are shown in FIG. 12, as well as FIG. 15. The link 546 is employed to operate a second plunger cam 552, adapted to open the grippers 212 on the master cylinder 42. The plunger cam 552 is shown in FIGS. 12–14. It will be seen that the plunger cam is in the form of a plate of irregular shape, mounted on the rear end of a pin 554 which is slidable in a stationary sleeve 556. A second guide pin 558 is secured to the plate 552 and is slidably received in an opening 560 formed in the frame plate 330.

The upper end of the link 546 is formed with a flange 562 which is connected by means of a pin 564 to one arm 566 of an L-shaped lever 568, swingable about a pivot 570. An upwardly projecting member or arm 572 is mounted on the lever 568 and is provided with a ball-shaped end portion 574. A socket 576 is formed in the pin 554 to receive the ball portion 574. The arm 572 extends through a slot 578 in the sleeve 556.

When the lever 526 is swung clockwise by the roller 524, the four-armed lever 534 is swung counterclockwise, and the link 546 is moved upwardly. The lever 568 is thereby swung clockwise so as to move the pin 554 and the plunger cam 552 rearwardly into the path of the roller 352 on the master cylinder 42. When the roller 352 engages the cam 552, the grippers 212 are swung open. The leading end of the master is pushed away from the master cylinder 42 by ejector fingers 220. The ejection of the master is completed by the ejection mechanism 80, which comprises fingers 582 adapted to strip the master from the master cylinder 42 and to direct the master between the rollers 84 and 86. The master is propelled by the rollers 84 and 86 into the receiving tray 82.

The stripper fingers 582 are shown generally in FIG. 1, and in greater detail in FIGS. 24–26. It will be seen that the fingers 582 are formed on one edge of a guide plate 584 which directs the ejected master between the rollers 84 and 86. Slots or notches 588 are formed between the stripper fingers 582 to provide for the passage of the gripper fingers 212. The stripper fingers 582 are narrow and are adapted to pass between the open grippers 212.

The lower roller 86 is divided into a plurality of sections 590 which project upwardly through slots 592 in the lower guide plate 584. Similarly, the upper roller 84 is divided into sections 594.

The upper and lower rollers 84 and 86 are constantly in engagement with each other and are continuously driven. Thus, the lower roller 86 is fitted with a gear 596 which meshes with an idler gear 598 driven by the main gear 166 on the master cylinder 42.

The upper roller 84 is frictionally driven by the lower roller 86. It will be seen that the upper roller 84 is mounted on a swing frame 600 which is biased in a clockwise direction by a spring 602. Thus, the spring 602 produces pressure between the rollers 84 and 86.

As shown in FIG. 25, two of the sections 590 of the lower roller 86 are fitted with narrow outwardly projecting rings or discs 604 which are effective to form longitudinal creases or ridges in the ejected master so as to stiffen the master and prevent it from curling after it is ejected into the receiving tray 82.

The stripper fingers 582 are adjusted so that they are closely spaced from the master on the master cylinder 42. Thus, when the leading end of the master is pushed outwardly by the outward swinging movement of the ejector fingers 220, the master is peeled off the master cylinder by the stripper fingers 582.

The control lever 70 is moved past the Eject position to the Wash position, which is as far as the lever will go in a counterclockwise direction. The master eject roller 524 displaces the lever 526 far enough so that the roller is able to pass the lever. It will be seen that the lever 526 has a curved cam surface 608 which is engaged and passed by the roller 524.

When the lever 70 is returned from the Wash position to the Neutral position, it passes through the Eject position, but the mast eject roller 524 moves past the eject lever 526 without actuating the eject mechanism. This return movement of the roller 524 produces counterclockwise movement of the lever 526, so that the pin 530 is swung away from the arm 532, without changing the position of the arm 532. The spring 536 is stretched so that the pin 530 is returned against the arm 532 after the roller 524 has passed the lever 526.

The movement of the control lever 70 to the Wash position actuates a blanket washer mechanism 610 which applies a solvent to the blanket on the blanket cylinder and is effective to wash the ink off the blanket. Those skilled in the art will be familiar with such blanket washers. To actuate the blanket washer 610, a roller 612 is mounted on the rear side of the detent cam 386. When the cam 386 is moved to the Wash position, the roller 612 engages a lever or pawl 614 and is effective to swing it in a clockwise direction about the pivot 468. It will be recalled that the pivot 468 also supports the actuating lever 466 for the image development control mechanism. The lever 614 is formed with a flange or ear 616 which is engageable with a pin 618 on a lever 620, also swingable about the pivot 468. Thus, the lever 620 is also swung in a clockwise direction.

The outer end of the lever 620 is connected by means of a pin 622 to a link 624 which extends to a lever 626 and is connected thereto by another pin 628. A spring 630 biases the lever 626 in a clockwise direction. The lever 626 is secured to a shaft 632 which also carries a lever arm 634. A link 636 of irregular shape is connected to the lever arm 634 by means of a pin 638. The other end of the link 636 is connected by means of a pin 640 to an arm 642 which is secured to a shaft 644. It will be seen that the actuating lever 646 for the blanket washer 610 is mounted on the shaft 644. The actuation of the lever 614 by the roller 612 causes the lever 646 to swing in a clockwise direction so as to actuate the blanket washer mechanism 610. The blanket washer is operated for a few revolutions of the blanket cylinder, and then the control lever 70 is returned to the Neutral position. The machine is now ready for the loading of another master onto the master cylinder 42. It will be noted that the rotation of the cylinders 42, 44 and 46 is maintained throughout the operating cycle of the machine. All of the functions of the machine may be carried out without stopping the cylinder 42–46.

In conclusion, it may be helpful to summarize the operation of the duplicating machine. Initially, it will be assumed that the machine is running so that the master, blanket and impression cylinders, 42, 44 and 46, are rotating. Moreover, it will be assumed that the control lever 70 is in the Neutral position and that no master is on the master cylinder 42.

The new master to be fed to the master cylinder 42 is placed on the master feed table 50 and is slid between the guide plates 56 and 58 until the master engages the stops 188 (FIGS. 1 and 8). The etch applicator 60 is then actuated by swinging the lever 66 clockwise as far as it will go. This moves the applicator pad 62 from the sponge 64 to the master cylinder so that the etching solution will be applied to the new master as soon as it is in place on the master cylinder 42.

The actuation of the lever 66 also triggers the control mechanism 160 for the master loading mechanism 48. Thus, the finger 138 (FIG. 3) swings the split lever 142 counterclockwise, which in turn swings the latch-operating lever 258 clockwise. The wire spring 272 urges the primary latch 246 in a counterclockwise direction.

When the high portion 240 of the cam 230 engages the roller 234, the follower lever 232 is swung a small amount in a counterclockwise direction. This relieves the latching pressure between the ear 250 on the lever 232 and the shoulder 248 on the primary latch 246, so that the spring 272 is able to move the primary latch in a counterclockwise direction to its unlatched position.

Thus, the follower lever 232 is also to follow the cam 230. The resulting clockwise movement of the follower lever 232 permits the lever 178 to move counterclockwise, with the result that the upper master feed roller 52 drops down onto the upper side of the master. At the same time, the stops 188 drop down out of the path of the master. The continuously rotating lower roller 54 feeds the master between the guide plates 56 and 58 to the grippers 212 on the master cylinder 42.

Meanwhile, the clockwise movement of the follower lever 323 has also caused the grippers 212 to be opened, so that the master will be fed into the crotch 224 between the grippers 212 and the ejector fingers 220. The opening of the grippers 212 is produced by the plunger cam 324 which is moved into the path of the roller 352 on the master cylinder 42. The plunger cam 324 is connected to the follower lever 232 by the linkage which comprises the link 302, the levers 308 and 318, the link 320 and the lever 340.

When the cam 230 has rotated through a full revolution, the follower lever 232 is relatched by the secondary latch 282, which restrains the follower lever 232 as long as the lever 66 is held in its actuated position. When the lever 66 is returned to its initial position, the primary latch 246 again moves into latching engagement with the ear 250.

The operator then moves the control lever 70 to the Ink position. The control cam 384 permits the lever 418 to move in a counterclockwise direction. Such movement of the lever 418 swings the lever 430 in a clockwise direction so as to cause the form roller 432 to move into engagement with the master on the master cylinder 42. Thus, ink is applied to the master.

Next, the operator moves the control lever 70 to the Image position. The roller 462 on the detent cam 368 moves the lever 466 in a counterclockwise direction and thereby swings the control lever 486 in a clockwise direction. This has the effect of causing the master cylinder 42 to shift into engagement with the blanket cylinder 44. Thus, the ink from the master is applied to the blanket on the blanket cylinder.

From the Image position, the control lever 70 is moved to the Feed position. The control cam 384 causes the lever 418 to swing counterclockwise an additional amount, with the result that the arm 456 is swung clockwise. Such movement starts the application of water to the oscillating roller 450 by the ductor roller 452. The water is transmitted to the form roller 432 and thence to the master cylinder 42.

The operator then moves the control lever 70 from the Feed position to the Feed On position. The pin 506 moves the lever 510 in a counterclockwise direction so as to move the control lever 522 in a counterclockwise direction. This turns on the feed mechanism so that paper sheets will be fed between the blanket and impression cylinders 44 and 46.

The control lever 70 returns by spring return action to the Feed position and is left in such position while the paper sheets are being printed. At the end of the desired run, the operator returns the master control lever to the Image position. The pin 508 engages the lever 510 and swings it in a clockwise direction to turn off the feed mechanism.

In moving between the Feed and Image positions, the control cam 384 causes the lever 418 to swing clockwise by an amount sufficient to terminate the application of water to the oscillating roller 450 by the water ductor roller 452.

The operator returns the lever 70 to the Ink position and then to the Neutral position. As a result, the control cam 384 swings the lever 418 in a clockwise direction so as to separate the form roller 432 from the master cylinder 42. Thus, the supply of ink to the master cylinder is interrupted.

From the Neutral position, the operator swings the lever 70 to the Eject position. The roller 524 causes clockwise movement of the lever 526, which in turn causes counterclockwise movement of the four-armed lever 534. The resulting upward movement of the link 456 moves the plunger cam 552 into the path of the roller 352 on the master cylinder 42. The grippers 212 are thus opened, so that the leading end of the master is pushed away from the master cylinder by the ejector fingers 220. Thus, the stationary stripper fingers 582 are able to get under the master and to strip the master off the cylinder 42. The master is projected between the constantly rotating rollers 84 and 86, which propel the master into the receiving tray 82.

From the Eject position, the operator moves the control lever 70 to the Wash position. The roller 612 operates the lever 614 which in turn operates the lever 620. As a result, the actuating lever 646 for the blanket washer is swung clockwise so that the blanket washer is effective to wash the ink off the blanket.

Finally, the operator returns the control lever 70 to the Neutral position. During such movement, the mast eject roller 524 displaces the lever 526 in a counterclockwise direction but does not actuate the master eject mechanism.

The machine continues to run and is now ready for another operating cycle. It will be recognized that the many functions required to complete an operating cycle are carried out very quickly and easily, with a minimum chance for error on the part of the operator. Thus, the duplicating machine is particularly well adapted for short run service, in which short printing runs are made from a large number of different masters. The machine is capable of greatly increased production in short run service, when compared with prior manually controlled machines. Moreover, the automatic features of the present machine insure that the proper procedures will be followed, so that good work will be produced, with little or no waste of paper. The present machine also makes it much easier to train operators. Moreover, operator fatigue is greatly reduced.

In some cases, it may be desirable to produce an offset duplicating machine which is simpler and lower in price than the machine described above. This may readily be done by eliminating the master loading mechanism 48. In the case of such a modified machine, the operation of mounting the master printing sheet on the master cylinder is done manually. To provide for manual loading of the new master, it is necessary to stop the machine after the old master has been ejected from the master cylinder by the master ejecting mechanism 80. For this purpose, the machine may be modified so that it will be stopped automatically when the control lever 70 is returned to the Neutral position, after being swung to the Eject and Wash positions, as previously described.

For this purpose, the modified machine may be provided with a stopping switch 660, mounted adjacent the cam cluster 380, as shown in FIG. 15. The detent cam is provided with a slope or lobe 662 which is adapted to operate the switch 660 when the control lever 70 is returned to the Neutral position. It will be seen that the lobe 662 is adjacent the high portion 408 of the detent cam and is at the same elevation. The switch 660 may be adapted for one-way operation, so that the high portion 408 will not be effective to operate the switch when the detent cam 386 is moved counterclockwise from the Neutral position to the master Eject position. Thus, the switch 660 has a main operating lever 664 with a one-way operating arm 666 swingably mounted thereon by means of a pivot 668. A follower roller 670 is mounted on the outer end of the arm 666. It will be seen that the oneway operating arm 666 extends radially inwardly with respect to the detent cam 386. When the detent cam is moved counterclockwise, the arm 666 is swung clockwise about its pivot 668, so that the switch 660 is not operated. When the high portion 408 has passed the roller 670, the arm 666 is returned to its initial position by a spring 672. When the detent cam 386 is moved in a clockwise direction, the lobe or slope 662 engages the roller 670 and is effective to swing the operating lever 664 counterclockwise so as to operate the switch 660.

Those skilled in the art will understand that the stopping switch 660 may be employed to shut off the electric drive motor for the machine. The stopping switch 660 may also be employed to control an electrically operated brake to stop the machine. The brake may be arranged to stop the machine in a particular position in which it is convenient to load the master manually on the master cylinder.

A modified machine of this character retains all of the operating ease afforded by the control lever. Moreover, the control lever insures that the proper procedures will be followed when printing runs are started and terminated. Thus, the modified machine is highly efficient and productive, particularly when the machine is used for a multiplicity of short runs.

We claim:

1. In a duplicating machine,
the combination comprising a master cylinder for carrying a master printing sheet, an etch mechanism including an applicator member movable against said cylinder for applying an etch liquid to the master printing sheet,
a movable control member which is operable to move said applicator member against said cylinder,
a movable clamp on said cylinder for securing the master printing sheet to said cylinder,
a movable clamp-operating cam follower on said cylinder for opening said clamp,
a clamp-operating cam movable into the path of said cam follower for opening said clamp,
a feed table for holding a new master printing sheet to be fed to said cylinder,
selectively operable feed means for feeding the new master printing sheet from said feed table to said cylinder,
said feed means being initially in an inactive condition and being movable to an active condition,
a power cam rotatable in timed relation to said cylinder,
a power follower for following said power cam,
resilient means for biasing said power follower toward said power cam,
said power cam having a high point and a low point,
a first latch initially latching said power follower away from said power cam so that only the high point of said power cam engages said power follower,
means operable by said control member for applying unlatching force to said first latch,
said unlatching force being effective to unlatch said power follower when said high point of said power cam engages said power follower whereby said power follower will follow said power cam,
means operable by said power follower during following movement thereof between said high and low points of said power cam for moving said feed means to its active condition whereby the new master printing sheet is fed to said cylinder,
additional means operable by said power follower for moving said clamp-operating cam into the path of said clamp-operating follower for opening said clamp to receive the new master printing sheet,
a second latch for relatching said power follower upon the return of said high point of said power cam into engagement with said power follower,
and means for relatching said first latch while unlatching said second latch upon the return movement of said control member.

2. In a duplicating machine,
the combination comprising a master cylinder for carrying a master printing sheet,
a movable clamp on said cylinder for holding the master printing sheet,
an etch mechanism operable to apply an etching liquid to the master printing sheet on said cylinder,
a movable control member for actuating said etch mechanism,
a selectively operable feed mechanism for feeding a new master printing sheet to said cylinder,
said feed mechanism being initially inactive and being movable to an active condition,
a cam rotatable in timed relation to said cylinder,
a follower for following said cam,
latching means for initially latching said follower in an inactive position,
means operable by said movable control member for causing said latching means to unlatch said follower whereby said follower will follow said cam,
means operable by the following movement of said follower for moving said feed mechanism to its active condition whereby the master printing sheet will be fed to said cylinder,
and additional means operable by the following movement of said follower for opening said clamp to receive the master printing sheet,
said latching means being effective to relatch said follower after said cam is rotated through a complete revolution.

3. A duplicating machine,
comprising a rotary master cylinder for carrying a master printing sheet,
a rotary blanket cylinder having a blanket engageable with said master printing sheet to receive an image therefrom,
a rotary impression cylinder for pressing copy sheets against said blanket,
a selectively operable copy sheet feed mechanism for feeding copy sheets between said blanket and impression cylinders,
a movable clamp on said master cylinder for holding the master printing sheet,
moistening means for applying repellent moisture to the master printing sheet on said master cylinder,
inking means for applying ink to the master printing sheet on said master cylinder,
selectively operable etch means for applying an etching liquid to the master printing sheet on said master cylinder,
selectively operable unified control means for actuating said etch means,
a selectively operable master sheet feed mchanism for feeding a new master printing sheet to said master cylinder in timed relation to the rotation thereof,
said master sheet feed mechanism being initially inactive and being movable to an active condition,
additional means operable by said unified control means for moving said master sheet feed mechanism to its active condition whereby the new master printing sheet is fed to said master cylinder,
and clamping means operable by said unified control means for opening said movable clamp in timed relation to the rotation of said master cylinder to receive the master printing sheet from said master sheet feed mechanism,
whereby operation of said unified control means causes actuation of said etch means, feeding of a new master printing sheet to said master cylinder, and opening of said movable clamp to receive the new master printing sheet.

4. A duplicating machine according to claim 3,
in which said unified control means comprise a manually operable control member.

5. A duplicating machine according to claim 3, including a cam rotatable in timed relation to said master cylinder for actuating said master sheet feed mechanism and said clamp opening means.

6. A duplicating machine,
comprising a master cylinder for carrying a master printing sheet,
a movable clamp on said cylinder for holding the master printing sheet,
an etch mechanism operable to apply an etching liquid to the master printing sheet on said cylinder,
unified control means for actuating said etch mechanism,
a selectively operable feed mechanism for feeding a new master printing sheet to said cylinder,
said feed mechanism being initially inactive and being movable to an active condition,
a cam rotatable in timed relation to said cylinder,
a follower for following said cam,
latching means for initially latching said follower in an inactive position,
means operable by said unified control means for causing said latching means to unlatch said follower whereby said follower will follow said cam,
means operable by the following movement of said follower for moving said feed mechanism to its active condition whereby the master printing sheet will be fed to said cylinder,
and additional means operable by the following movement of said follower for opening said clamp to receive the master printing sheet,
said latching means being effective to relatch said follower after said cam is rotated through a complete revolution whereby operation of said unified control means causes actuation of said etch means and feeding of a new master printing sheet to said master cylinder.

7. A duplicating machine,
comprising a rotary master cylinder for carrying a master printing sheet,
a rotary blanket cylinder having a blanket engageable with said master printing sheet to receive an image therefrom,
a rotary impression cylinder for pressing copy sheets against said blanket,
a selectively operable copy sheet feed mechanism for feeding copy sheets between said blanket and impression cylinders,
a movable clamp on said master cylinder for holding the master printing sheet,
moistening means for applying repellent moisture to the master printing sheet on said master cylinder,
inking means for applying ink to the master printing sheets on said master cylinder,
selectively operable etch means for applying an etching liquid to the master printing sheet on said master cylinder,
unified control means for actuating said etch means,
a selectively operable master sheet feed mechanism for feeding a new master printing sheet to said master cylinder,
a selectively releaseable timing mechanism operable in timed relation to the rotation of said master cylinder,
said timing mechanism being initially inactive and being releaseable to an active condition,
means operable by said unified control means for releasing said timing mechanism,
means operable by said timing mechanism for operating said master sheet feed mechanism to feed the new master printing sheet to said master cylinder in timed relation to the rotation thereof,
and clamp operating means operable by said timing mechanism for opening said clamp in timed relation to the rotation of said master cylinder to receive the master printing sheet from said master sheet feed mechanism,
whereby operation of said unified control means causes actuation of said etch means, feeding of the new master printing sheet to said master cylinder, and opening of said clamp to receive the new master printing sheet.

References Cited
UNITED STATES PATENTS

| | | | |
|---|---|---|---|
| 2,759,416 | 8/1956 | George et al. | 101—217 |
| 2,977,874 | 4/1961 | Ritzerfeld | 101—145 |
| 2,990,768 | 7/1961 | Fischetti | 101—217 |
| 3,056,346 | 10/1962 | Gammeter et al. | 101—218 X |
| 3,102,470 | 9/1963 | Cragg et al. | 101—144 |
| 3,153,380 | 10/1964 | Gericke | 101—142 |
| 3,303,778 | 2/1967 | Tonkin et al. | 101—144 |
| 3,431,841 | 3/1969 | Tonkin et al. | 101—142 |

EDGAR S. BURR, Primary Examiner

U.S. Cl. X.R.

101—147, 409